United States Patent [19]

Trainor et al.

[11] 4,349,595
[45] Sep. 14, 1982

[54] FRICTION MATERIAL FOR CLUTCH FACINGS AND THE LIKE

[75] Inventors: James T. Trainor, Huntington; Stanley F. Covaleski, Milford; John C. Adelmann, Stratford, all of Conn.

[73] Assignee: Raybestos-Manhattan, Inc., Trumbull, Conn.

[21] Appl. No.: 50,596

[22] Filed: Jun. 21, 1979

[51] Int. Cl.³ .......................... D04H 3/02; D04H 3/07
[52] U.S. Cl. ................................... 428/64; 192/107 M; 428/65; 428/257; 428/902
[58] Field of Search ............... 192/107 M; 428/64, 65, 428/257, 902

[56] References Cited

U.S. PATENT DOCUMENTS

| 3,063,966 | 11/1962 | Kwolek et al. | 528/336 |
| 3,472,819 | 10/1969 | Stephens | 528/331 |
| 3,556,922 | 8/1968 | Green et al. | 428/902 X |
| 3,560,137 | 2/1971 | Hahn | 8/154.5 |
| 3,713,934 | 1/1973 | Morton | 428/257 X |
| 3,927,241 | 12/1975 | Augustin | 428/65 X |
| 4,045,608 | 8/1977 | Todd | 428/65 X |
| 4,118,528 | 10/1976 | Lowry | 428/65 |
| 4,244,994 | 1/1981 | Trainor et al. | 428/64 X |

FOREIGN PATENT DOCUMENTS 2708488 8/1978 Fed. Rep. of Germany .
2000517 1/1979 United Kingdom .

Primary Examiner—Louis Rimrodt
Attorney, Agent, or Firm—Howson and Howson

[57] ABSTRACT

Friction compositions consisting of aramid fibers bonded together with cured organic binders are disclosed. The compositions are particularly useful in the preparation of automotive clutch facings and brake linings.

15 Claims, 4 Drawing Figures

FRICTION MATERIAL FOR CLUTCH FACINGS AND THE LIKE

BACKGROUND OF THE INVENTION

The present invention relates to novel friction compositions containing aramid fibers, and more particularly to automotive clutch facings and like friction elements made from such compositions.

The automotive industry is ever in search of improved friction materials for use in automobiles, trucks, and other motor vehicles. One particular area where improved friction materials have been sought is in the design and fabrication of clutch facings. Criteria of particular importance in clutch facing design are a burst strength adequate to meet ever higher rotational speeds of vehicle drive chains, an adequate coefficient of friction, and reduction in wear to increase the useful life of clutches.

Major manufacturers of automotive clutch facings require that clutch facings meet a particular performance standard in the hot burst strength test. In this test, the driven member of the clutch, with two facings attached, is heated to 500° F. for 15 minutes and then be subjected to spin testing as a prerequisite to product acceptance. This test is one of the most difficult tests to be passed by a clutch facing since at elevated temperatures fibrous materials and the binder comprising resin and/or rubber of which the clutch facing is formed lose strength, resulting in bursts at relatively low rotational speeds. Conventional clutch facings formed of asbestos fibers having an OD of 11 inches and an ID of 6½ inches are known to withstand spin speeds of about 8,000 to 9,000 r.p.m. in the hot burst strength test.

As spin requirements for clutch facings have become more demanding, glass fibers have been used to strengthen the facings while asbestos has been retained as the friction material.

More recently, in an effort to improve hot burst strength, clutch facings have been formed from bundles of parallel continuous glass filaments spirally or randomly wound upon themselves in the form of an annular disc and impregnated with heat-curable cement. Such constructions are described in U.S. Pat. Nos. 3,743,069 and 3,756,910.

According to U.S. Pat. No. 4,130,537, glass, as the active friction ingredient of a friction element, is too "aggressive" for most commercial applications, the aggressiveness being manifested during use by noise, vibration and/or erratic friction effects when the friction element is engaged with a mating surface. In order to overcome this shortcoming, the patent teaches the inclusion of infusible organic fibers having a decomposition temperature above 400° F. but below 800° F. Aramid fibers sold by duPont under the name Nomex are given as an example of such fibers.

Conventional clutch facings formed of asbestos fibers, although having adequate friction properties, e.g. a coefficient of friction of from about 0.22 to about 0.44, in addition to having limited hot burst strength, also exhibit a relatively high rate of wear on the order of about 0.01-0.012 inches for each 10,000 engagements. Although glass fiber clutch facings exhibit improved hot burst strength and somewhat reduced wear, as compared to asbestos fiber clutch facings; nevertheless, there continues to be a need for improvements in both of these essential properties.

It is an object of this invention to provide a novel friction composition containing aramid fibers which is particularly suitable for preparation of automotive clutch facings and brake linings.

Another object of the invention is to provide clutch facings composed of aramid fibers and possessing increased hot burst strength and improved wear properties.

These and other objects of this invention will become apparent from the following detailed description of the invention and accompanying drawings in which.

DETAILED DESCRIPTION OF THE INVENTION

Figure 1:
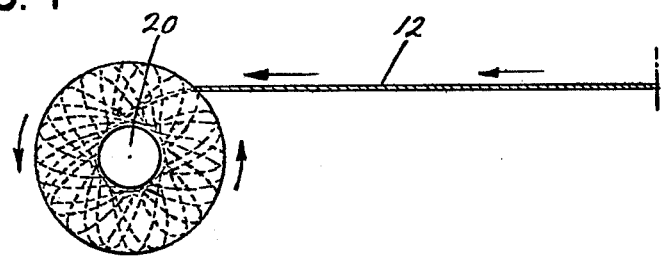
FIG. 1 represents a tape formed of continuous aramid fibers impregnated with a heat-curable cement wound upon itself into disc-like form.

This invention provides in a composition aspect a friction material comprising as essential constituents, aramid fibers and a thermosetting binder or cement. The binder, when thermoset, forms a matrix for the aramid fibers in the friction element made from the friction composition.

The aramid fibers used in the present invention are commercially available in yarn form under the trademark "Kevlar". Aramid is a generic name for fibers made by reacting an aromatic diacid chloride with an aromatic diamine, the acid group of the diacid chloride and the amine groups of the diamine being meta or para oriented relative to each other at low temperatures (below 100° C.). The aramid polymers of which the fibers are made are of high molecular weight and are characterized predominantly by the recurring structural unit:

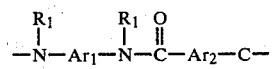

wherein $R_1$ is hydrogen or lower alkyl and wherein $Ar_1$ and $Ar_2$ may be the same or different and may be an unsubstituted divalent aromatic radical or a substituted divalent aromatic radical, the chain-extending bonds of these divalent aromatic radicals being oriented meta or para to one another and the substituents attached to any aromatic nucleus being one or more or a mixture of lower alkyl, lower alkoxy, halogen, nitro, lower carbalkoxy, or other groups which do not form a polyamide during polymerization.

Aramid polymers of the type of which the fibers used in the friction compositions of this invention are made are described in considerable detail in U.S. Pat. No. 3,094,511, and the disclosure of that patent is incorporated herein by reference. Such aramid fibers should have a decomposition temperature of at least about 850° F., preferably above about 900° F.

Particularly preferred aramid fibers which may be used in the friction compositions of this invention are formed of polymers which are the condensation product of terephthalic acid and p-phenylendiamine. An example of fibers of this type are those having a decomposition temperature generally on the order of about 930° F., a density of 1.44 g./cm.$^3$, a fiber diameter of about 0.0005 inches, a tenacity of about 21 grams/denier, and a tensile strength of about 400,000 psi.

Depending upon the particular friction element to be fabricated from the friction compositions of this invention, the aramid fibers may be continuous filaments, staple fibers, or chopped fibers, the latter being of relatively uniform length of from about $\frac{1}{8}''$ to 2" in length. The chopped fibers may also be crimped. For example, in clutch facings made according to the invention the use of aramid yarn composed of continuous filaments is preferred. On the other hand staple fibers and chopped fibers are especially useful in the manufacture of disc brake pads.

In addition to aramid fibers, the friction materials of this invention include a cement composition comprising heat-hardenable resin, vulcanizable elastomer, and friction modifiers.

The heat-hardenable or thermosetting resin may be of the phenolic type, such as the phenol aldehydes, examples of which are phenol formaldehyde, resorcinol formaldehyde, phenol-cresol formaldehyde, and phenol furfural resins. If desired, such resins may have been rendered oil-soluble by reaction with linseed or cashew nut oil. A preferred phenolic resin is a phenol formaldehyde resin. Other suitable thermosetting resins include epoxy resins, epoxidized phenolic resins, melamine formaldehyde resins, and the like.

The vulcanizable elastomer in the cement may be natural rubber or a synthetic elastomer such as neoprene, butadiene-styrene, butadiene-acrylonitrile, isoprene, acrylate rubber, the more recently developed hydrocarbon elastomers comprising a copolymer of ethylene, propylene and a third monomer, such as dicylopentadiene, which provides unsaturation for curing, and the like, and especially those elastomeric materials which are curable or vulcanizable by reaction to a set stage by peroxide or through sulfur linkages. The elastomer-containing cement, of course, will also include well known vulcanizing and stabilizing agents.

The cement composition preferably contains conventional friction modifiers which ordinarily comprise particulate inorganic materials such as clay, silica, alumina cryolite, litharge and barytes, or organic materials such as graphite, carbon black and particles formed of polymerized cashew nut oil.

Typical cement compositions particularly suitable for bonding the aramid fibers according to this invention, are as given in Table I, below:

TABLE I

| Constituent | Parts By Weight |
| --- | --- |
| Vulcanizable elastomer | 5–15 |
| Thermosetting Resin | 5–25 |
| Accelerator | 0.05–0.5 |
| Curing Agent | 1–12 |
| Particulate Friction Modifiers | 10–50 |

The cement composition generally will contain from about 20 to about 80 percent vulcanizable elastomer solids and from about 80 to about 20 percent of heat-hardenable resin solids, based on the combined weight of the two. Preferably, the cement composition contains equal parts by weight of elastomer and resin.

The cement may be applied to the aramid fibers in the form of a solvent base mixture. Suitable solvents include toluene and other well known volatile organic solvents which are relatively non-toxic.

The proportions of aramid fibers and heat-hardenable cement used in the friction compositions of this invention will depend upon the particular friction element to be fabricated therefrom. In the case of friction facings, the heat-hardenable cement may comprise from about 40 to about 95 percent, by weight, (dry basis), based on the total weight of cement and fibers. Preferably, in friction facings the heat-hardenable cement comprises from about 60 to about 80 percent. In the case of friction facings in the form of disc brake pads and the like, the cement may be present in an amount from about 65 to about 90 percent, based on the combined weight of cement and fibers, depending on the desired brake performance.

The friction compositions of this invention also are useful in the manufacture of disc brake pads and brake linings.

In preparing disc brake pads according to this invention, short aramid fibers, e.g. chopped fibers, and heat-hardenable cement are blended uniformly, a blade-type mixer being generally suitable for such purpose. The mix is removed from the mixer and placed in a hot air circulating oven, at a temperature on the order of about 150° F., to reduce the amount of volatile constituents present to between about 4 and 6 percent. The dried mix, which may be in the form of pellets, may then be cold molded into disc brake pad preforms following which the preforms may be molded in a preheated mold, post cured, and ground to specified tolerances.

As an alternative procedure, disc brake preforms may be blanked out of an annular clutch facing preform prepared as described hereinbelow in connection with the drawings. The disc brake preforms so obtained may be placed in a preheated mold and pressed, postcured and ground to the required tolerances.

In the friction compositions of this invention a portion, for example up to about 30 percent, by weight, of the aramid fibers may be replaced by other fibers, both organic and inorganic, examples of which are cotton, jute, hemp, nylon, rayon, glass and asbestos fibers.

Referring to the drawings, the reference numeral 10 indicates an annularly shaped disc-like friction element such as a clutch facing.

Figure 2:
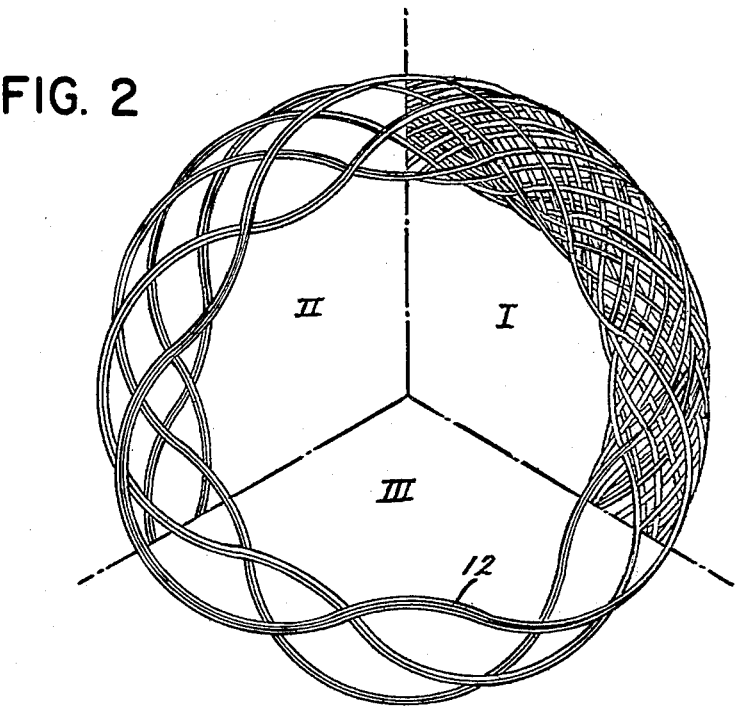
FIG. 2 shows a clutch facing of aramid fiber tape impregnated with heat-curable cement in three stages of its formation.

The clutch facing is formed by wrapping continuous bundle or tape 12 of generally continuous aramid filaments coated with a heat-curable cement comprising heat-hardenable resin and heat-curable elastomer as described hereinabove in undulating fashion, as shown in FIGS. 1 and 2, to form a disc-like preform which is then consolidated and the cement is cured by application of heat and pressure. FIG. 1 shows schematically the method by which continuous tape 12 is wound in undulating manner into a revolving mandrel 20, whereby the tape constantly varies in the instantaneous radius at which it is being wound.

As particularly illustrated in FIG. 2, the clutch facing 10 is shown as having three segments I, II, and III, which segments illustrate the complete clutch facing I, and the intermediate (II) and (III) stages of formation of the preform.

The tape 12 is formed by combining a plurality of, generally 2 to 15, and preferably 5 to 10, yarns of continuous aramid filaments or fibers.

The aramid fibers may be coated with heat-hardenable cement by any suitable means. Preferably, the coating means is such as to splay or open up the fiber bundles to provide an opportunity for the cement dispersion to penetrate into the fiber bundle more easily so that all of the filaments are contacted by the cement and pick up cement solids along their length.

There are various devices in the textile field which are designed to splay or separate bundles of fibers to enhance pick up of various coating materials. For example, the yarns may be passed through a comb-like device before they enter the coater, which generally is of the roller type, whereby the fiber bundles are open up for intimate contact with the coating composition.

Following coating of the fibers with cement, the fibers, usually in the form of a yarn, are dried by being passed through an oven, such as a hot air circulating oven or one equipped with infra red heating means.

Preferably, the fibers are given a precoat of a phenolic resin, e.g., a phenol formaldehyde resin prior to being coated with heat-hardenable cement. This may be accomplished by passing the yarn bundles through an alcohol/water solution of the phenolic resin. Such solutions may contain on the order of about 10 to 12% resin solids, and the proportions by weight of alcohol to water in such solutions may vary from about 60:40 to 40:60; The resin pick up by the aramid fibers will be on the order of about 10-12% based on the combined weight of resin and fibers.

Following application of the heat-curable cement to the fibers and removal of solvent, the yarns are combined to form a tape by gathering together a plurality of yarns, e.g. 5 to 10, by rotating rollers or the like which twist the yarns together. In the resulting tape there may be a small amount of twist.

As used in this specification and claims, a "yarn" refers to a collection or assembly of a great number of substantially parallel individual aramid filaments. Thus, a yarn may include from 100 to 2000, preferably 1000 to 2000 individual filaments gathered together in any manner well known in the art. Such yarns ordinarily will be free of twist, but may have a relatively small amount of twist not exceeding about one turn per foot. The aramid filaments of which the yarns are formed are extrememly fine, an example being about 0.0005 inches. The yarn may also be composed of staple fibers, such yarn being from about 500 to 10,000, preferably from 4000 to 6000 denier.

As noted above, a tape formed of continuous aramid filaments, or of staple fibers if desired, pre-coated with thermosetting resin and coated with heat-hardenable cement, is wound preferably in undulating fashion onto a revolving mandrel in such manner that in the resulting preform the convolutions of the tape vary in the instantaneous radius at which they are being wound. This arrangement is best illustrated in FIG. 2 of the drawings. However, the tape may be spirally rather than randomly wound to form an annular friction facing preform.

Rather than employing a tape comprised of aramid yarn, the tape may be in the form of a knitted structure or woven fabric. For example, a suitable tape may be obtained by wrapping a woven fabric containing aramid fibers around a mandrel and slitting the fabric into strips of suitable width, e.g. ½ to ⅝ inches in width. A knitted tape may also be prepared using aramid fibers in warp and fill with a catch thread of nylon, polyester or other organic fiber to stabilize the tape. Such tapes are then coated with heat-curable resin, dried and wound in spiral or undulating fashion to obtain an annular preform.

The resulting disc-shaped friction facing preform is then placed in a mold and pre-heated at elevated temperatures in the range of about 350° to 375° F., under a pressure of about 3500 to 5000 psi for a short period of time, e.g. 2–3 minutes, to consolidate and densify the preform and at least partially cure the cement. Subsequently, the resulting facings are placed in an oven heated to a temperature of about 400° to 450° F., where they remain for several hours. During this latter heat treatment the binder is converted into the infusible, insoluble state.

Figure 3:
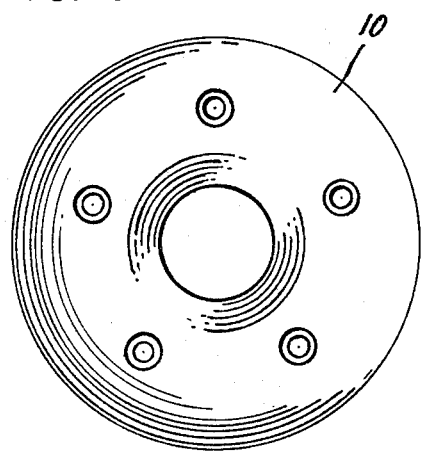
FIG. 3 is an elevation or face view of a clutch facing according to this invention.
Figure 4:
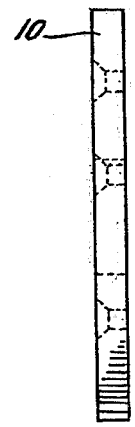
FIG. 4 is a side or edge view of the clutch facing shown in FIG. 3.

The clutch facings are then subject to conventional mechanical processing such as grinding to achieve acceptable tolerance, and drilled to provide holes by means of which the facings are attached to the power train of an internal combustion engine (see particularly FIGS. 3 and 4).

The invention is further illustrated by the following examples.

EXAMPLE 1

This example describes the preparation of clutch facings according to this invention.

Eight strands of 1500 denier continuous filament yarn made of aramid polymer (Kevlar 29) were coated with a thermosetting cement composition having the formulation set forth in Table II.

TABLE II

| Constituent | Weight Percent |
| --- | --- |
| Toluene | 54.0 |
| Natural rubber | 4.6 |
| Phenol formaldehyde resin | 2.5 |
| Particulate friction modifiers | 34.6 |
| Tackifier | 0.7 |
| Accelerators | 0.2 |
| Curing agents | 3.4 |

This coating was applied continuously by passing the yarns through a dip tank containing the cement and then drying the coated yarn in a drying oven maintained at 248° F. Using this procedure the cement pick up was 75 to 83%, by weight of dried cement, based on the total weight of the coated fibers.

A tape was formed by gathering together four of the coated and dried yarns, and this tape was wound in undulating fashion onto a revolving mandrel in such manner that the convolutions of the tape varied in the instantaneous radius at which they were wound. The preforms prepared in this manner weighed 390 g. and were molded in a clutch facing mold at 4000 psi and 320° F. for 3 minutes. Subsequently the clutch facings were further heated at 400°–450° F. for a period of hours to convert the binder to the infusible, insoluble state.

The facings were ground to the following dimensions: O.D. 11"; I.D. 6½"; thickness 0.137" and then drilled in order that they could be tested for friction and wear properties, and hot burst strength.

EXAMPLE 2

A clutch facing prepared according to Example 1 was tested for hot burst strength according to the below described procedure.

The clutch facing was riveted to the driven member, and the mounted facing was then heated for 15 minutes in an oven maintained at 500° F. The mounted clutch facing was removed from the oven and attached to the rotatable shaft of a centrifugal burst machine. The test was immediately begun and the driven member to which the test clutch facing was mounted reached 3500 rpm in approximately 2 seconds. Thereafter the speed of the driven member was increased at an average rate of approximately 135 rpm/sec. Test results are recorded in terms of the speed of rotation at the time the clutch facing bursts.

The clutch facing containing aramid fibers prepared as described in Example 1 did not burst even though the maximum speed of 10,000 rpm for the machine was reached. This indicated that the hot burst strength of the clutch facings was in excess of 10,000 rpm.

EXAMPLE 3

Clutch facings prepared as described in Example 1 were subjected to a Controlled Torque Test using a Long Clutch Dynomometer as described below.

The thickness of the facings was measured at ten different places at the O.D. and I.D., and then the facings were tested for friction properties using the following procedure.

1. The clutch is applied for 4 seconds at 1100 rpm and a constant torque of 235 lb. ft. in each application. The clutch output torque is controlled by limiting the engagement of the clutch through means of the adjustment in the releasing mechanism. Adjustment can be made to achieve only an average value of output torque during the 4 second engagement.
2. The clutch is released for 56 seconds followed by reapplication.
3. After 100 applications, a 15 second hot fade test at full pressure is made.
4. Without cooling, the pressure is adjusted immediately to a controlled torque of 235 ft. lbs., and 100 additional applications are made.
5. Another 15 second hot fade test at full pressure is made, followed by an additional 100 applications at controlled torque without cooling.

Coefficients of friction (maximum and minimum) are made during the first, second and third fades, and the data obtained are set forth in Table III below.

TABLE III

| Fade No. | Coefficient of Friction | |
|---|---|---|
| | Maximum | Minimum |
| 1 | 0.38 | 0.22 |
| 2 | 0.38 | 0.27 |
| 3 | 0.37 | 0.26 |

The thickness of the test clutch facing was remeasured following the test and wear was found to be only 0.002 inches.

EXAMPLE 4

This example describes the preparation of clutch facings using continuous filament aramid yarn precoated with a thermosetting phenol formaldehyde resin.

Six strands of 1500 denier aramid yarn (Kevlar 29) were precoated with a water soluble, heat curable, phenolformaldehyde resin by passing the yarn through an alcohol/water solution containing 10% resin solids to achieve a resin pick up to 10.3% by weight of dry resin, based on total weight of coated yarn.

The dried, precoated yarn was then coated with the solvent base cement of Table II and six strands of the coated yarn were formed into a tape having a cement pick up of 75% by weight of dry coating, based on the total weight coated tape.

Using this tape, preforms for clutch facings were prepared, molded and post cured as described in Example 1.

EXAMPLE 5

The clutch facings prepared as described in Example 4 were subjected to the Controlled Torque Test as described in Example 3, and the results obtained are as follows:

TABLE IV

| Fade No. | Coefficient of Friction | |
|---|---|---|
| | Maximum | Minimum |
| 1 | 0.38 | 0.28 |
| 2 | 0.37 | 0.28 |
| 3 | 0.36 | 0.27 |

An average wear value of 0.0045 inches was observed.

EXAMPLE 6

A clutch facing prepared as described in Example 4 was installed on a 1978 Ford F-150 truck having a four speed transmission and the clutch facing was moderately worked without being overly abrasive.

After each 10,000 engagements, the clutch facing wear was determined by measuring the variation in thickness of the facing. The results of this test are set forth in Table V below:

TABLE V

| Number of Engagements | Incremental Wear, inches |
|---|---|
| 10,000 | 0.0122 |
| 20,000 | 0.0002 |
| 30,000 | 0.0006 |
| 40,000 | 0.0004 |
| 50,000 | 0.0006 |
| 60,000 | 0.0002 |

The relatively high initial wear after the first 10,000 engagements is believed to be due to non-uniformity of the ground surface of the clutch facing resulting in only partial contact with the mating member of the clutch assembly.

EXAMPLE 7

The tape of Example 1 was used to prepare a number of 2 inch by 3 inch specimens which were molded, cured and post cured under the conditions stated in Example 1. These specimens were then tested for tensile strength using a Tinius Olsen tensile tester. Some slippage in the jaws of the tester was observed, but tensile strengths ranging from 16,000 to 28,500 psi were calculated from the test data.

EXAMPLE 8

Clutch facings were prepared as described in Example 4 with the exception that spun 2/1 aramid (Kevlar) yarn was used in place of continuous filament yarn. The phenolic resin precoat pick-up was 10% by weight, based on coated fibers, and the cement pick-up was approximately 85%.

The clutch facings so prepared were subjected to the Controlled Torque Test described in Example 3, and the results obtained are as follows:

TABLE VI

| Fade No. | Coefficient of Friction | |
|---|---|---|
| | Maximum | Minimum |
| 1 | 0.33 | 0.32 |
| 2 | 0.36 | 0.31 |
| 3 | 0.37 | 0.29 |

An average wear value of 0.003 inches was observed.

EXAMPLE 9

Clutch facings were prepared as described in Example 4 with the exception that spun 2/1 aramid (Kevlar) yarn was used in place of continuous filament yarn. The phenolic resin precoat pick-up was about 10% by weight, and the cement pick-up was approximately 75%.

Clutch facings so prepared were subjected to the Controlled Torque Test described in Example 3, and the results obtained are as follows:

TABLE VII

| Fade No. | Coefficient of Friction | |
|---|---|---|
| | Maximum | Minimum |
| 1 | 0.33 | 0.26 |
| 2 | 0.33 | 0.26 |
| 3 | 0.33 | 0.26 |

An average wear value of 0.004 inches was observed.

It is claimed:

1. A friction element of improved resistance to wear comprising from about 5 to about 60 percent of aramid fibers having a decomposition temperature of at least about 850° F. bonded together with from about 40 to about 95 percent of heat-hardenable cement comprising a thermosetting resin and a heat-curable elastomer, said percentages being by weight based on the combined weight of fibers and cement, said element having been subjected to heat and pressure to consolidate said fibers and to cure said cement.

2. A friction element according to claim 1 in which said aramid fibers are formed of the condensation product of terephthalic acid and p-phenylenediamine.

3. A friction element according to claim 2 in which said aramid fibers have a decomposition temperature of about 930° F.

4. A friction element according to claim 1 in which said heat-hardenable cement comprises from about 20 to about 80 percent, by weight of phenol formaldehyde resin and from about 80 to about 20 percent of natural rubber.

5. A friction element according to claim 4 in which said heat-hardenable cement comprises about 50 percent resin and about 50 percent rubber.

6. A friction element according to claim 1 in which said aramid fibers have a decomposition temperature of at least about 900° F.

7. A disc-shaped friction facing having an inner diameter and an outer diameter, said facing comprising a tape impregnated with a heat-hardenable cement and disposed in spiral or undulating fashion and having been subjected to heat and pressure to compress said tape to form a disc-shaped facing and to cure said cement, said tape comprising a plurality of strands of aramid fibers having a decomposition temperature of at least about 850° F. coated with a heat-hardenable cement comprising a thermosetting resin and a heat-curable elastomer, said friction facing comprising from about 40 to about 95 percent of heat-hardenable cement, said percentages being by weight based on the total weight of fibers and cement in said facings.

8. A friction facing according to claim 7 in which said strands are formed of substantially continuous aramid fibers and said tape is disposed in undulating fashion.

9. A friction facing according to claim 7 comprising from about 60 percent to about 80 percent heat hardenable cement.

10. A friction facing according to claim 7 in which said cement comprises from about 20 to 80 percent, by weight, of thermosetting resin, and from about 80 to about 20 percent of heat-curable elastomer.

11. A friction facing according to claim 10 in which said heat-hardenable cement comprises about 50 percent resin and 50 percent rubber.

12. A friction facing according to claim 7 in which said aramid fibers have a decomposition temperature of at least about 900° F.

13. A friction facing according to claim 7 in which said heat-hardenable cement comprises phenol formaldehyde resin and natural rubber.

14. A friction facing according to claim 7 in which said aramid fibers are formed of the condensation product of terephthalic acid and p-phenylenediamine.

15. A friction facing according to claim 14 in which said aramid fibers have a decomposition temperature of at about 930° F.

* * * * *